United States Patent Office 3,239,348
Patented Mar. 8, 1966

3,239,348
ESTROGENIC COMPOUNDS AND ANIMAL
GROWTH PROMOTERS
Edward B. Hodge, Phil H. Hidy, and Herbert L. Wehrmeister, all of Terre Haute, Ind., assignors to Commercial Solvents Corporation, a corporation of Maryland
No Drawing. Filed Feb. 15, 1965, Ser. No. 432,848
10 Claims. (Cl. 99—2)

The present invention relates to new compounds and an object of the present invention is to provide compounds which exhibit estrogenic activity or aid in increasing the rate of growth in meat-producing animals, e.g. cattle, lamb and swine.

A conventional formula for the compounds of the present invention is:

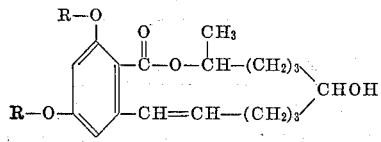

where R is hydrogen or substituted or unsubstituted alkyl, e.g. lower alkyl such as methyl, ethyl, hexyl, etc., but hydrogen is preferred. Compounds having the above formula wherein R is substituted or unsubstituted aryl, e.g. phenyl and bromophenyl; acyl, e.g. acetyl and valeryl; and aralkyl, e.g. benzyl, are also contemplated by the present invention. There are two diastereoisomers of the compounds of the present invention.

The compounds can be administered to animals by any suitable method including oral and parenteral administrations. For example, the compound can be blended with ordinary feed containing nutritional values in an amount sufficient to produce the desired rate of growth and thus be fed directly to the animals, or the compound can be suspended in a suitable injection suspension medium such as peanut oil and injected parenterally. The amount of compound fed to an animal, of course, varies depending upon the animal, desired rate of growth and the like.

When the new compounds are to be administered in feeds, an animal feed composition may be prepared containing the usual nutritionally-balanced quantities of carbohydrates, proteins, vitamins and minerals, together with a compound of the present invention. Some of these usual dietary elements are grains, such as ground grain and grain by-products; animal protein substances, such as those found in fish meal and meat scraps; vegetable proteins like soybean oil meal or peanut oil meal; vitaminaceous materials, e.g. vitamin A and D mixtures; riboflavin supplements and other vitamin B complex members; and bone meal and limestone to provide minerals. A type of conventional feed material for use with cattle includes alfalfa hay and ground corn cobs together with supplementary vitaminaceous substances if desired.

The compounds of the present invention can be produced from the compound:

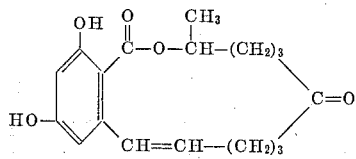

hereinafter referred to as the fermentation estrogenic substance (F.E.S.) by selective reduction of the ketone group. The nomenclature used herein is based upon the F.E.S. compound. For example, the compounds of this invention are produced by the selective reduction of the ketone group to an alcohol group. The compound wherein R is hydrogen is referred to as F.E.S. alcohol. When both R's are alkyl the compound is referred to as dialkyl F.E.S. alcohol.

The reduction of the ketone group is preferably carried out with the F.E.S. suspended or dissolved in a suitable solvent, e.g. an alcohol, preferably a lower alkanol such as methanol, ethanol, etc. In general, the reduction can be accomplished at ambient pressures by heating the F.E.S. solution with sodium borohydride and recovering the reduced F.E.S.

In producing compounds of the present invention where R is alkyl, conventional alkylation procedures can be used to replace the H atom of one or both of the OH groups on the benzene ring of F.E.S. with an alkyl group. Alkylated F.E.S. compounds can be produced, for example, by first alkylating F.E.S. and then reducing it as set forth supra. The alkylation can be by reaction with the corresponding dialkyl sulfates, e.g. dimethyl sulfate, diethyl sulfate, etc. to produce the dialkyl F.E.S. or a monoalkyl F.E.S. with the alkyl group replacing the hydrogen of the hydroxyl group on the benzene ring ortho to the ester group. Furthermore, a monomethyl F.E.S. compound with the methyl group replacing the hydrogen of the hydroxyl group para to the ester group can be selectively produced using diazomethane.

The fermentation estrogenic substance (F.E.S.) is so named since a convenient method for producing it is by cultivating, on a suitable nutrient medium, the organism *Gibberella zeae* (Gordon) on deposit at the Northern Utilization Research and Development Division of the United States Department of Agriculture under the number NRRL–2830.

The following examples are offered to illustrate this invention; however the invention is not limited to the specific materials, amounts, and procedures set forth. The first example illustrates preparation of a suitable inoculum containing the organism *Gibberella zeae* (Gordon) NRRL–2830.

*Example I*

A spore sand culture containing *Gibberella zeae* (Gordon) NRRL–2830 was aseptically placed in a sterile tube containing 15 milliliters of Czapek's-Dox solution and a small amount of agar. This medium was then incubated for about 168 hours at approximately 25° C. At the end of the incubation period, the medium was washed with 5 milliliters of sterile deionized water and transferred to a sterile tube containing 45 milliliters of Czapek's-Dox solution. The contents of the tube were then incubated for about 96 hours at about 25° C. after which the material was available for use in inoculation of a fermentation medium.

The following example illustrates the fermentation of the organism *Gibberella zeae* (Gordon) NRRL–2830 to produce F.E.S.

*Example II*

To a 2 liter flask were added 300 grams of finely divided corn. The flask and its contents were then sterilized and after sterilization 150 milliliters of sterile deionized water were added. To the mixture in the flask were then added 45 milliliters of the inoculum prepared by the process of Example I and the material was thoroughly mixed. The mixed material was then incubated for about 20 days at 25° C. in a dark room in a water-saturated atmosphere.

The following example illustrates the recovery of F.E.S. from the fermentation medium.

*Example III*

A 300 gram portion of fermented material produced by the method of Example II was placed in 500 milliliter of deionized water and slurried. The slurry was then heated for about 15 minutes at 75° C., 300 grams of filter aid were then added and the material was filtered. The solid filtered material containing the anabolic substance was then air dried, and 333 grams of the dried cake were then extracted with 500 milliliters of ethanol. This procedure was repeated three more times. The ethanol extract was evaporated to dryness under vacuum to give 6.84 grams of solid material. This solid material was then dissolved in 20 milliliters of chloroform and extracted with 30 milliliters of an aqueous solution containing 5% by weight of sodium carbonate having an adjusted pH of about 11.2. The extraction process was repeated seven more times. The pH of the sodium-carbonate extract was then adjusted to 6.2 with hydrochloric acid, to yield an anabolic substance-containing precipitate. The precipitate and the aqueous sodium carbonate extract were then each in turn extracted with 75 milliliters of ethyl ether. This procedure was repeated three more times to yield a light yellow ethereal solution, which was then evaporated to yield 116 milligrams of solid anabolic substance. This material was then subjected to multiple transfer countercurrent distribution using 100 tubes and a solvent system consisting of two parts chloroform and two parts carbon tetrachloride as the lower phase and four parts methanol and one part water as the upper phase, all parts by volume. The solid material obtained from the multiple transfer countercurrent distribution was F.E.S.

The production of F.E.S. alcohol, i.e. reduction of the ketone group is illustrated by the following example.

*Example IV*

Sodium borohydride (1 gram) was slowly added to 50 milliliters methanol and 0.3 gram F.E.S. while cooling the resultant reaction mixture. The mixture was heated for 2 hours on a steam bath and the methanol is evaporated. The residue is neutralized with HCl and extracted with two 40 milliliter portions of ether. The ether was evaporated and the residue dissolved in 10 milliliters isopropyl alcohol. After addition of 5 milliliters water and partial evaporation, the product, 0.21 gram melted at 91–106° C. The F.E.S. alcohol hydrate product was recrystallized, was found to have a melting point of 90–102° C. and analyzed:

|  | Calculated | Found |
|---|---|---|
| Percent C | 63.88 | 62.93 |
| Percent H | 7.74 | 7.71 |

The following example illustrates the production of monomethyl and dimethyl F.E.S. alcohol, the monomethyl F.E.S. alcohol having a methyl group which replaced the hydrogen of the hydroxyl group on the benzene ring ortho to the ester group.

*Example V*

Dimethyl sulfate (5 milliliters) was added to a solution of 2.24 gram F.E.S. in 80 milliliters of 10% NaOH solution and 20 milliliters of water. The mixture was stirred for one-half hour at 18–20° C. (cooling bath) and an additional 5 milliliters of dimethyl sulfate was added. After an additional 70 minutes of stirring at 20–26° C., the solid precipitate, Solid A was collected by filtration, washed with water and dried. The filtrate from Solid A was acidified with 25 milliliters 12 N $H_2SO_4$ to yield a second precipitate, Solid B, which was collected, washed with water and dried.

Solid A (0.79 gram having a melting point of 114–118° C.) was recrystallized from a mixture of 10 milliliters water and 15 milliliters ethanol to yield 0.66 gram dimethyl F.E.S. having a melting point of 108–110° C.

Solid B (1.39 gram having a melting point of 152–162° C.) was recrystallized twice from a mixture of water and alcohol to yield 0.80 gram of monomethyl F.E.S. having a melting point of 169–174° C. Analysis of Solid B showed:

|  | Calc. ($C_{19}H_{21}O_5$) | Found |
|---|---|---|
| Percent C | 68.65 | 67.97 |
| Percent H | 7.28 | 7.16 |
| Percent OMe | 9.34 | 9.28 |

The ketone group of each of the dimethyl F.E.S. and monomethyl F.E.S. are reduced according to the procedure of Example IV to produce dimethyl F.E.S. alcohol and monomethyl F.E.S. alcohol.

*Example VI*

Monomethyl F.E.S. with the methyl group replacing the hydrogen of the hydroxyl group on the benzene ring para to the ester group was prepared by the following procedure.

Nitrosomethylurea in an amount of 1.2 grams was slowly added to a cold mixture of 3.6 milliliters of 50% potassium hydroxide and 17 milliliters of ether. After a few minutes the yellow ether layer of the mixture was decanted, dried over potassium hydroxide, and then added to a solution of 0.30 gram F.E.S. in 17 milliliters of ether. The resulting yellow mixture was left overnight in a loosely stoppered flask and then ether and diazomethane were evaporated off using a steam bath. The remaining gummy residue was crystallized by adding 3 milliliters of water, heating to 60° C., and adding ethanol almost to solution. On cooling, crystals formed, yielding 0.137 gram of product having a melting point of 111–116° C. which was recrystallized in the same way to yield 0.082 gram of monomethyl F.E.S. having a melting point of 120–122° C. and the following analysis:

|  | Calc. ($C_{19}H_{24}O_5$) | Found |
|---|---|---|
| Percent C | 68.7 | 68.3 |
| Percent H | 7.28 | 7.38 |
| Percent $OCH_3$ | 9.34 | 9.17 |

The ketone group of the methyl F.E.S. is reduced according to the procedure of Example IV to produce methyl F.E.S. alcohol.

*Example VII*

Six head of cattle are fed a daily ration including a mixture of alfalfa hay and ground corn cobs containing from 1 to 20 ounces of F.E.S. alcohol per hundred pounds of ration.

It is claimed:
1.

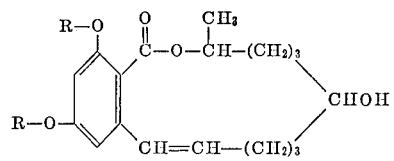

wherein R is selected from the group consisting of hydrogen and lower alkyl.

2. An animal feed comprising a nutritional diluent and growth promoting amounts of the compound of claim 1.

3. The compound of claim 1 wherein R is hydrogen.

4. The compound of claim 1 wherein R is methyl.

5. The compound of claim 1 wherein the R ortho to the ester group is methyl and the other R is hydrogen.

6. The compound of claim 1 wherein the R para to the ester group is methyl and the other R is hydrogen.

7. An animal feed comprising a nutritional diluent and growth promoting amounts of the compound of claim 3.

8. An animal feed comprising a nutritional diluent and growth promoting amounts of the compound of claim 4.

9. An animal feed comprising a nutritional diluent and growth promoting amounts of the compound of claim 5.

10. An animal feed comprising a nutritional diluent and growth promoting amounts of the compound of claim 6.

References Cited by the Examiner

UNITED STATES PATENTS 2,842,051  7/1958  Brian et al. _____ 99—2

OTHER REFERENCES

Stob et al.: Nature, vol. 196, page 1318, December 29, 1962, QI N2.

A. LOUIS MONACELL, *Primary Examiner.*